(No Model.)
A. DE BOVET.
MAGNETIC BRAKE.
No. 481,842. Patented Aug. 30, 1892.
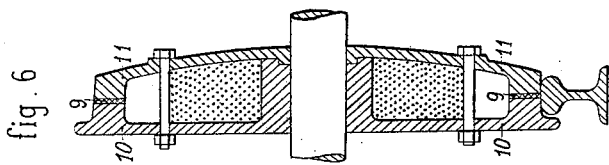
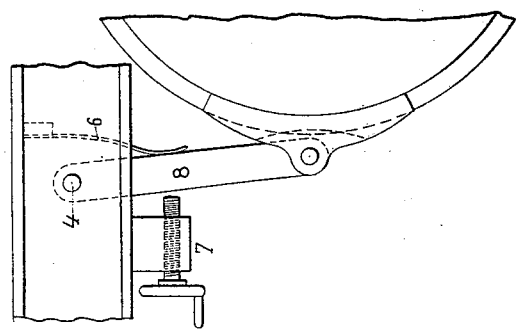 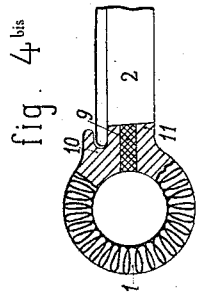
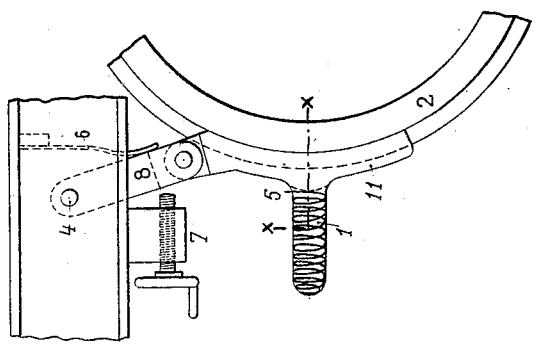
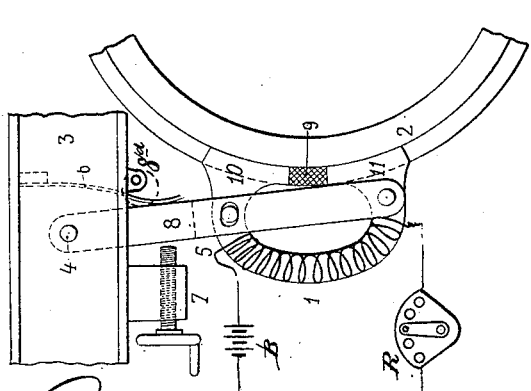 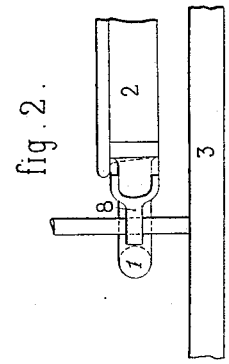
Witnesses
J. A. Rutherford
Robert Everett
Inventor
Armand de Bovet
By James L. Norris.
Attorney.

UNITED STATES PATENT OFFICE.

ARMAND DE BOVET, OF PARIS, FRANCE.

MAGNETIC BRAKE.

SPECIFICATION forming part of Letters Patent No. 481,842, dated August 30, 1892.

Application filed October 24, 1891. Serial No. 409,751. (No model.)

*To all whom it may concern:*

Be it known that I, ARMAND DE BOVET, a citizen of France, residing at Paris, in the Department of the Seine, France, have invented a new and useful Improvement in Magnetic Brakes, of which the following is a specification.

My invention relates to railway-brakes of the kind ordinarily in use, and the purpose thereof is to provide a magnetic brake capable of being held upon the tread of the wheel or in close proximity thereto by magnetic attraction. It is my purpose, also, to combine with a brake of this type simple and adjustable means whereby the released brake may be held at any desired distance from the tread of the wheel, whereby the magnetic attraction shall draw the brake upon the wheel with certainty. It is my purpose, also, to combine with such a brake an adjustable stop whereby it may be arrested when magnetized and held close to but out of contact with the tread of the wheel.

The invention consists, to these ends, in the novel mechanical apparatus explained in the following specification, and then more particularly pointed out and defined in the claims which follow the description.

To enable others skilled in the art to understand and practice my said invention, I will proceed to describe the same in detail, reference being had to the accompanying drawings, showing a preferred form of apparatus, and in which—

Figure 1 is a side elevation showing a railway-brake in which my invention is incorporated. Fig. 2 is a plan view of the parts shown in Fig. 1. Fig. 3 is a side elevation showing a modified construction. Fig 4 is a plan view of the parts shown in Fig. 3. Fig. 4$^{bis}$ is a horizontal section upon the line $x\,x$, Fig. 3. Fig. 5 is a side elevation showing a further modification. Fig. 6 is a vertical section taken through the wheel in its central or axial plane.

Practical tests of this invention have demonstrated that it is possible to obtain, even when employing an electric current which is comparatively feeble, a frictional resistance greatly in excess of that ordinarily produced heretofore by other methods. For example, it is found that where a bar of iron twelve kilograms per meter is placed vertically and tangent to the surface of a pulley the two sides of which form the poles of an electro-magnet receiving current from a dynamo there will be no slip of the pulley until a weight of three hundred and twenty kilos is applied, and with a current sufficient to cause the bar to adhere to the magnet a weight of three hundred and seventy-five kilograms was required to overcome the friction developed. I apply these results to the brakes of railway-trains in the manner indicated in the accompanying drawings, in which—

The reference-numeral 1 denotes a core, the ends of which connect with curved plates 10 and 11, adapted to make frictional contact with the wheel, like the shoe of an ordinary brake. The core and its curved plates are supported from the sill 3 by a rock-shaft 4, from which hangs a forked bar 8, the end portions of the core 1 being arranged in the fork, where they are held by transverse fastenings of any usual kind. The core 1 is wound with wire 5, the terminals of which are supplied from any convenient source of electricity—such as a storage-battery, voltaic cells, dynamo, &c.—represented by B, Fig. 1. The brake is thrown off the wheel by its own gravity when there is no current in the electro-coil 5, its separation being insured by a spring 6. This separation, however, is regulated as to the interval permitted by a set-screw 7, which holds the curved plates 10 and 11 in such position that they will at no time be distant from the face of the wheel 1 by more than a narrow interval in order that a feeble current in the wire 5 shall suffice to draw the brake against the face of the wheel. The brake-shoe thus formed constitutes an electro-magnet, the poles of which are formed by the curved plates 10 and 11, which are separated from each other between the poles 10 and 11 by an insulation 9, as shown in Fig. 1.

The fork 8, by which the brake is suspended from the sill 3, should be of a non-magnetic or non-conducting material.

The core 1 and pole-pieces 10 11 are usually constructed, as shown in Figs. 1 and 2, in such manner that the slip of the wheel upon the shoe takes place in substantial parallelism with the line of direction of the current energizing the electro-magnet.

In Figs. 3 and 4, on the other hand, I have represented an arrangement of the same parts in a similar manner, but with the core and pole-pieces which constitute the brake-shoe so arranged that the slip of the wheel shall be at right angles to the plane in which the current flows. The best effects will be obtained when sufficient current is supplied to the wire 5 to give saturation to the curved plates 10 and 11, or if the electro-coil is placed in the wheel, as in Fig. 6, sufficient current should be supplied to saturate the parts corresponding to the poles of the electro-magnet. Currents of less intensity, which fall short of producing this effect, will produce less frictional resistance.

An ordinary brake will easily be regulated for various effects by inserting in the circuit a variable resistance—such, for example, as that shown at R, Fig. 1. The energy required can be stored beneath the carriages, and brakes constructed in accordance with this principle may readily be adapted to any ordinary form of railway without any material change in construction.

The separation of the pole-pieces or curved plates 10 11 from the wheel after the current is switched off may be effected in any preferred manner. The simplest method is to make substantially the arrangement shown in the drawings, by which a suitable spring 6, aided by gravity, will throw the brake off when the attraction ceases. There will be no occasion to limit the recoil of the brake, so that the curved faces of the plates 10 and 11 shall remain very near the face of the wheel, but out of contact.

The brake may be used as a simple stop-brake or as a brake to diminish speed or to hold the train upon heavy grades or as a sudden-stop brake in case of accident or distress. By arresting the electro-magnet formed by the core 1 and curved plates 10 and 11 at such a point that the said curved plates shall stand very close to the wheel, but not in actual contact, a retarding effect will be produced, varying according to the variation in the interval of separation or the closeness of contact, the wheel being caused thereby to revolve in the magnetic field. In order to effect this arrest of the magnetized plates or pole-pieces 10 and 11, any form of stop may be employed which will limit the movement of the fork 8—such, for example, as a stop 8ª, mounted on the sill 3 and consisting of a simple cam which may be turned so that the fork 8 will abut against it.

I may excite the wheel or convert it into an electro-magnet, using the brake-shoe as an armature. This form is shown in Figs. 5 and 6 and consists, substantially, in dividing the wheel to form the poles of the electro-magnet and separating the parts by an insulating-cushion 9 of bronze or other suitable material. The interior of the wheel is provided with a coil 5, the poles of the resulting magnet being united by the axle.

I would remark here that by applying the same principle to the wheels of a locomotive in the manner substantially shown in Fig. 6 a marked adherence to the rails is produced, which is one of the results contemplated by my invention.

What I claim is—

1. In a railway-brake, the combination, with a core having separate curved plates constituting pole-pieces, of a hanging support for the parts, a spring throwing the curved plates or pole-pieces off the wheel, an adjustable stop to hold said pole-pieces close to the tread of the wheel, a conducting-coil wound upon the core, and a circuit for said coil, substantially as described.

2. In a railway-brake, the combination, with a core having curved pole-pieces forming part of the extremities of said core, of a coil surrounding said core, a circuit for the coil, a link pivoted at one end upon a fixed support and at the other end pivotally connected to the core, an adjustable stop behind the link to hold the pole-pieces close to the tread of the wheel, and an adjustable cam-stop in front of said link to arrest the brake when the pole-pieces are magnetized and hold the latter out of contact with but close to the tread of the wheel, substantially as described.

In testimony whereof I have signed this specification in the presence of two subscribing witnesses.

ARMAND DE BOVET.

Witnesses:
W. JONES,
G. DELOM.